April 15, 1924.
L. L. BORNHOLDT
COMPRESSION TESTER
Filed Feb. 26, 1923
1,490,584
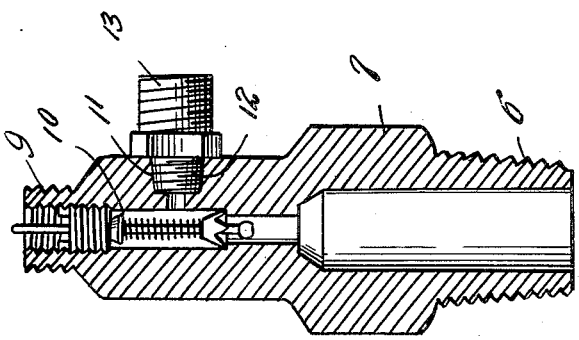
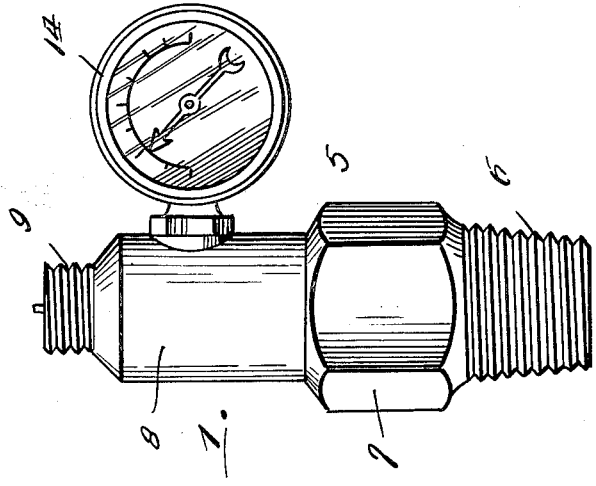
L. L. Bornholdt,
Inventor Patented Apr. 15, 1924.

1,490,584

UNITED STATES PATENT OFFICE.

LOUIS L. BORNHOLDT, OF HIGHMORE, SOUTH DAKOTA.

COMPRESSION TESTER.

Application filed February 26, 1923. Serial No. 621,172.

*To all whom it may concern:*

Be it known that I, LOUIS L. BORNHOLDT, a citizen of the United States, residing at Highmore, in the county of Hyde and State of South Dakota, have invented certain new and useful Improvements in Compression Testers, of which the following is a specification.

My invention relates to compression testers, specifically adapted for testing the compression within the cylinders of internal combustion engines, the device being relatively simple of construction and inexpensive of manufacture.

A further object of my invention resides in the provision of such a compression tester, wherein it may be easily ascertained whether or not compression is being lost, through the inlet or exhaust valves, or through the rings of the pistons.

The nature and advantages of the invention will be better understood when the following detailed description is read in connection with the accompanying drawings, the invention residing in the construction, combination, and arrangement of parts as claimed.

In the drawing forming part of this application, like numerals of reference indicate similar parts in the several views, and wherein:—

Figure 1 is an elevation of my compression tester.

Figure 2 is a vertical detailed cross sectional view thereof.

Referring to the drawing in detail, 5 designates my tester as a whole, the same including a metallic body having a screw threaded lower end 6, an angular portion 7 above this screw threaded end, a cylindrical portion 8 together with a reduced screw threaded upper end 9. The said body is formed with a central air passage within the upper end of which is a normally closed valve 10, similar in all respects to the usual valves employed in connection with the inner tubes of pneumatic tires. The cylindrical portion 8 of the said body is formed with a screw threaded opening 11, which communicates with the said air passage of the body, this screw threaded opening being adapted to receive the screw threaded end 12 of a plug or pipe 13 to which may be secured a pressure gauge 14 or a desirable form of valve cap (not shown). In the practical use of my device for testing the compression of engine cylinders, the spark plug within the cylinder to be tested, is first removed, after which, my tester may be screwed into the usual spark plug opening, it of course being understood that the screw threaded end 6 of the body is screwed into this opening. After the tester has been applied in this manner, the crank shaft is turned so as to bring the piston of the cylinder to be tested, to a position midway of its compression stroke, the same being maintained in such a position by preventing the rotation of the crank shaft in any manner desirable. Compressed air may be forced into the cylinder by applying one end of an air hose to the said reduced and screw threaded end 9 of the body, or if desirable, the air hose of a usual hand pump may be secured to the said end of the body. After a sufficient amount of air has been injected into the cylinder, this amount being registered by the gauge 14, it may be easily ascertained whether or not, the leakage is between the walls of the piston and cylinder, or through the inlet or exhaust valves, the leakage past the piston being best determined by the escape of air into the crank case and detected at the oil filling vent and leaky valves by the escape of air through the valve ports, the intake and exhaust manifolds being previously removed for this purpose.

In view of the above description, it is believed by me that the advantages and operation of a tester of this character will be readily appreciated by those skilled in the art, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent is:

An engine tester comprising a body adapted to be applied to and penetrate the engine casing, said body having a passageway therethrough and provided at a point between its ends with a compartment, a pipe connected with the side of the body and communicating with the said compartment, a plug detachably mounted in the body and forming the top end wall of the compartment, a valve stem passing centrally through the plug and the compartment and disposed in the passageway below the lower end of the compartment and being provided with an enlarged lower end, a valve mounted upon the stem and adapted to close the passageway through the plug, a valve mounted upon the stem and having a serrated lower surface which bears against the bottom wall of the compartment at a point below the point of communication between the pipe and the compartment, and a spring interposed between said valves and serving to hold them spaced against the opposite ends of the compartment.

In testimony whereof I affix my signature.

LOUIS L. BORNHOLDT.